April 29, 1969     A. NIELSEN     3,441,906
SIGNAL APPARATUS FOR AUTOMOTIVE VEHICLES
Filed Oct. 24, 1965
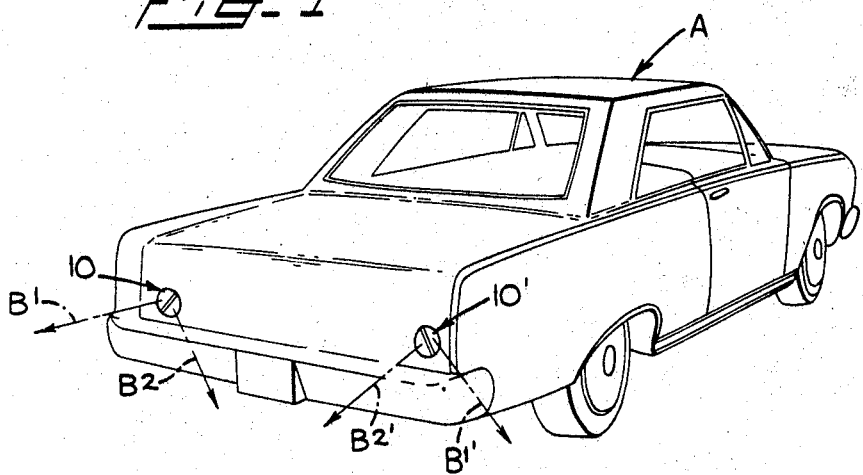
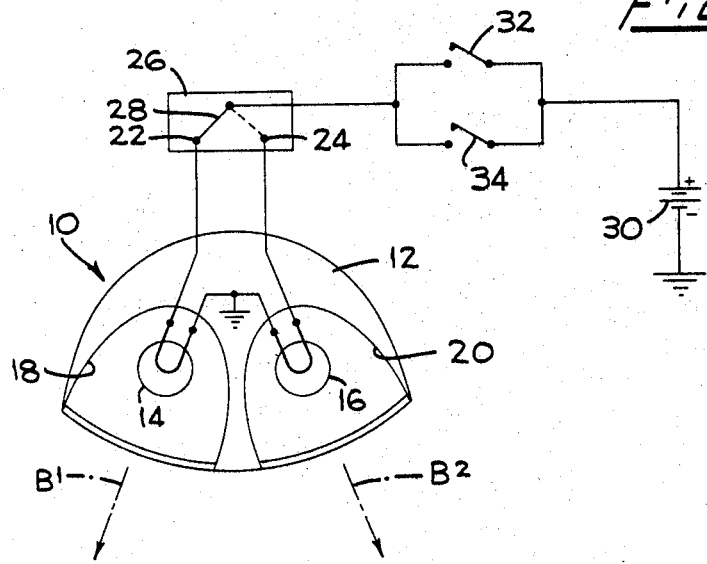
INVENTOR.
ARTHUR NIELSEN
BY Paul B. Fike
PATENT AGENT United States Patent Office

3,441,906
Patented Apr. 29, 1969

3,441,906
SIGNAL APPARATUS FOR AUTOMOTIVE
VEHICLES
Arthur Nielsen, 12 Normandy Way,
Santa Clara, Calif. 95050
Filed Oct. 24, 1965, Ser. No. 504,594
Int. Cl. B60q 1/44
U.S. Cl. 340—72          2 Claims

ABSTRACT OF THE DISCLOSURE

Signal apparatus for an automotive vehicle including a pair of tail lights, each of which has two sections arranged for alternate energization to produce divergent light beams.

---

The present invention relates generally to signal apparatus and more particularly to signal apparatus for automotive vehicles and the like to provide an indication of braking.

As is well known, conventional tail lights on automotive vehicles are energized upon application of the vehicle brakes to direct parallel beams of light substantially rearwardly from the vehicle and conventionally, such braking signals produce light of greater intensity than that produced by the tail lights as normally lighted during night time operation of the vehicle. However, because of various intensities of tail and braking lights on different vehicles, some ambiguity exists between signaling information provided by the steady beams emanating from the rear of a vehicle with or without brakes having been applied. Such ambiguity has, in turn, resulted in a relatively large number of rear-end collisions.

In addition, since the beams of light emanating from the rear of a vehicle are conventionally directed in parallelism directly rearwardly relative to the direction of vehicle travel, a succeeding car may derive a signal from the vehicle immediately preceding, but no visual signal will be derived from vehicles further advanced in a series of vehicles traveling, for example, one after another on a crowded freeway. The cumulative reaction times of drivers in such a succession of vehicles has, in turn, produced a number of rear-end collisions, which number of collisions has mounted astronomically in proportion to the increased number of vehicles on the roads and particularly on crowded freeways.

Accordingly, it is a general object of the present invention to provide an improved signal apparatus which produces visually obvious and unambiguous information to a recipient.

More particularly, it is a feature of the invention to provide a signal apparatus designed primarily though not exclusively for application to an automotive vehicle to produce signaling information pertinent to the application of the vehicle brakes.

Yet more specifically, it is a feature of the invention to provide a signal apparatus embodying the intermittent flashing of two or more sources of light.

Additionally, it is a feature of the invention to provide a signaling apparatus having two or more light sources arranged to produce divergent beams of light.

Quite specifically, it is a feature of the invention to provide divergent flashing beams of light emanating from the respective rear corners of an automotive vehicle so as to produce signaling information which is available not only to an immediately succeeding vehicle, but a vehicle separated from the signaling vehicle by one or more intermediate vehicles.

These as well as other objects and features of the invention will become more apparent from a perusal of the following description of the exemplary apparatus illustrated in the accompanying drawing wherein:

FIG. 1 is a perspective view of an automotive vehicle having signal lights mounted at its rear corners in accordance with a preferred embodiment of the invention, and FIG. 2 is a schematic diagram of the electrical circuit associated with the signal lights.

With initial reference to FIG. 1, a pair of signal lights 10, 10' embodying the present invention are mounted at the rear of an automotive vehicle A at the respective rear corners thereof in the positions normally occupied by conventional tail lights. The two signal lights 10, 10' are substantially identical and are accordingly differentiated only by the prime notation.

With additional reference to FIG. 2, each of the signal lights 10 preferably takes the form of a single housing 12 which mounts two lamps 14, 16 in advance of substantially parabolic reflectors 18, 20 so that each section creates a highly directional beam of light. As shown, the lamps 14, 16 and the reflectors 18, 20 are angularly disposed so that two divergent beams of light indicated at $B_1$ and $B_2$ are generated thereby.

The signal light 10 at the left rear of the automotive vehicle A is mounted thereon so that one beam of light $B_1$ will be directed rearwardly from the vehicle but also upwardly and outwardly and, in turn, the second beam $B_2$ will be directed downwardly and inwardly. The second signal light 10' is mounted at the rear rigid corner of the vehicle in mirror symmetry so that again one beam of light $B'_1$ therefrom is directed outwardly and upwardly and the other, $B'_2$ is directed downwardly and inwardly, all of the light beams emanating in a generally rearward direction.

Preferably, in accordance with an additional aspect of the present invention, means are provided for alternately energizing the two lamps 14, 16 in each signal light 10. One such means is diagrammatically illustrated in FIG. 2 wherein one terminal of each of the lamps 14, 16 is connected to ground and the other terminal of the two lamps are connected respectively to the two output terminals 22, 24 of an automatic alternating switch 26 of a conventional type whose switch arm 28 is periodically moved from the full line position to the dotted line position in an intermittent, periodic fashion. The alternating switch 26 is, in turn, electrically connected to one side of a source of electrical power indicated as a battery 30, the other side of the battery being grounded. The connections between the alternating switch 26 and the source of power 30 are made through two parallel lines, one of which includes a switch 32 that is actuated by the brake pedal of the vehicle and the other of which contains a manual switch 34 positioned at any convenient location in the driver's compartment in the automotive vehicle.

If the brake pedal of the vehicle be depressed, the one switch 32 will be closed to supply current through the alternating switch 26 first to the left lamp 14, as shown in FIG. 2. After a predetermined period, the alternating switch arm 28 will move from the full line to the dotted line disposition so that the first signal lamp 14 will be extinguished and the second lamp 16 will be lighted. Such intermittent lighting will continue so long as the brake pedal is depressed. A similar operation will occur if, alternatively, the manual switch 34 is closed. The two signal lights 10 and 10' are preferably connected in parallel so that the circuit to the second signal light 10' is substantially identical to that shown in FIG. 2.

When the two signal lights 10, 10' are actuated in the fashion described, initially two beams of light will be directed generally rearwardly from the automotive vehicle but also in an outward and upward direction so as to be visible not only to the immediately succeeding vehicle but also to vehicles in further succession along a series of vehicles on the roadway. After the predetermined period as set by the alternating switch 26, these upward and outward beams will be extinguished and the downward and inward beams will be energized, the latter being particularly visible to succeeding vehicles when a wet roadway is being traversed. In addition to the variance in direction of the beams, the intermittent flashing thereof provides an attention factor that is much greater than the resultant from conventional steady braking lights. Furthermore, the intermittent flashing of the beams of light energized by the depression of the brake pedal will be unambiguously distinguishable from the steady glow of the tail lights of the vehicle which may be of a conventional nature.

In summary, the divergent directional characteristics of the signal lights coupled with the intermittent flashing thereof provides to the driver of a succeeding vehicle visually obvious and unambiguous signal information to which his attention is very forcefully directed. Because of the divergent characteristics of the beams, such information is delivered to not only the immediately succeeding vehicle but to others in a line of vehicles.

What is claimed is:

1. Signal apparatus for automotive vehicles or the like which comprises
 a pair of dual lights,
 each dual light being arranged to provide two divergent beams of light upon energization, and
 means mounting each of said dual lights at the rear corner of a vehicle so that one beam of each dual light is directed upwardly and outwardly and the other beam of each dual light is directed inwardly and downwardly relative to the direction of travel of the vehicle.

2. Signal apparatus according to claim 1 which comprises
 means for alternately energizing each beam of each dual light.

References Cited

UNITED STATES PATENTS

| | | | |
|---|---|---|---|
| 2,655,642 | 10/1953 | Ayres et al. | 340—83 |
| 2,876,432 | 3/1959 | Gordon et al. | 340—81 |
| 3,305,829 | 2/1967 | Knez | 340—72 |

ALVIN H. WARING, *Primary Examiner.*

U.S. Cl. X.R.

340—74, 83